H. S. STANSBURY.
ARMORED TIRE.
APPLICATION FILED MAR. 16, 1914.
1,119,894.
Patented Dec. 8, 1914.
2 SHEETS—SHEET 1.
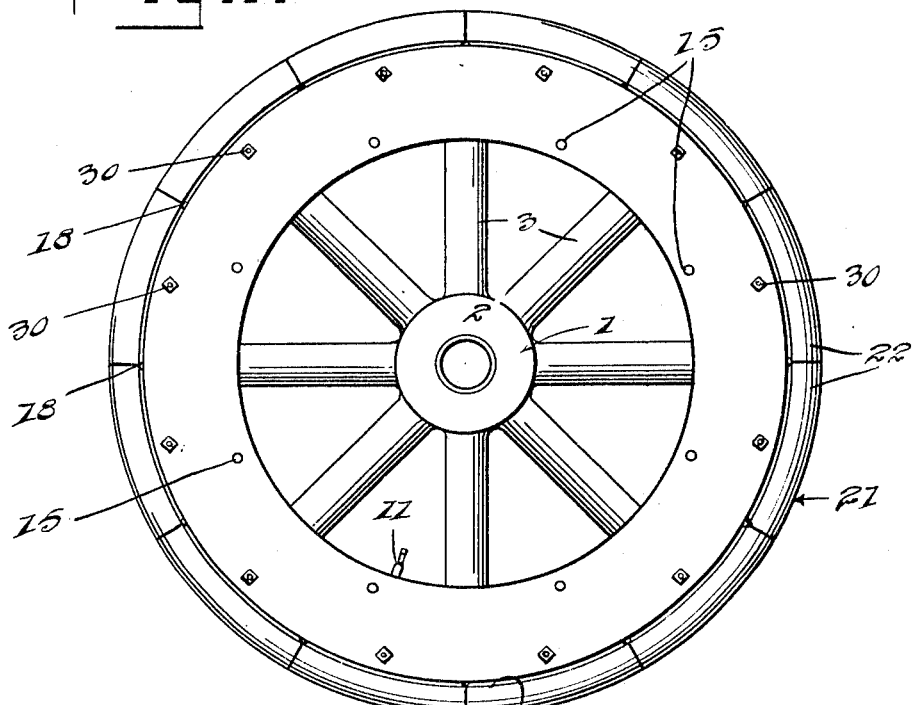
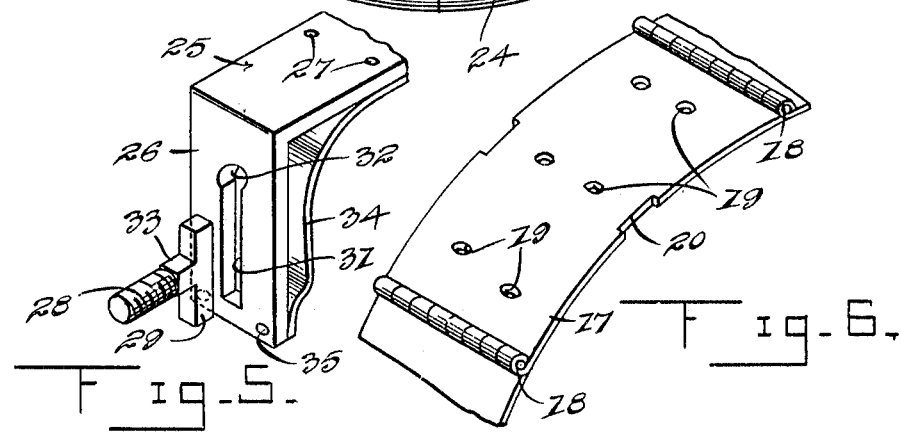
Witnesses
C. R. Beale.
Chas. F. Churn
Inventor
Harry S. Stansbury.
By
Attorney

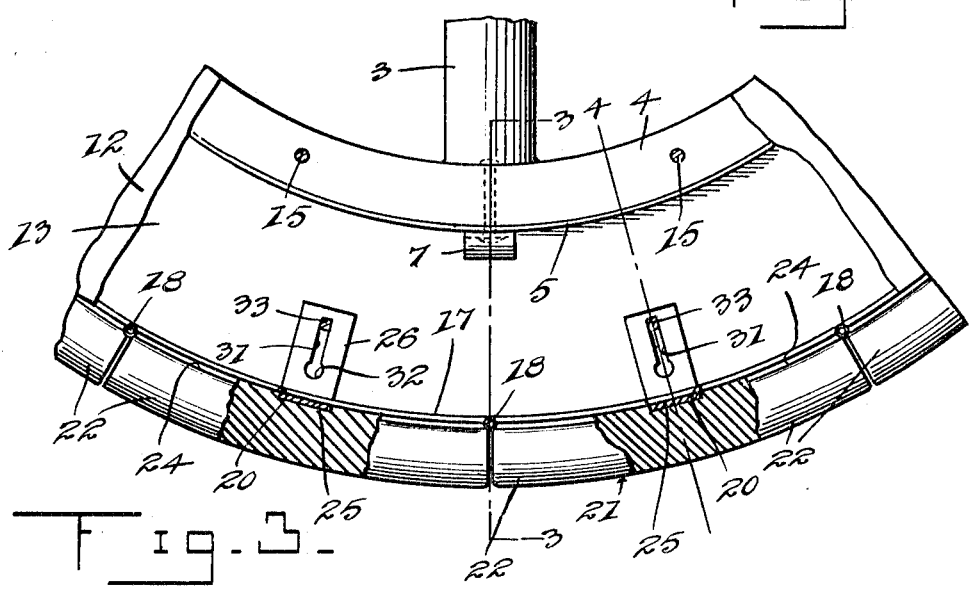
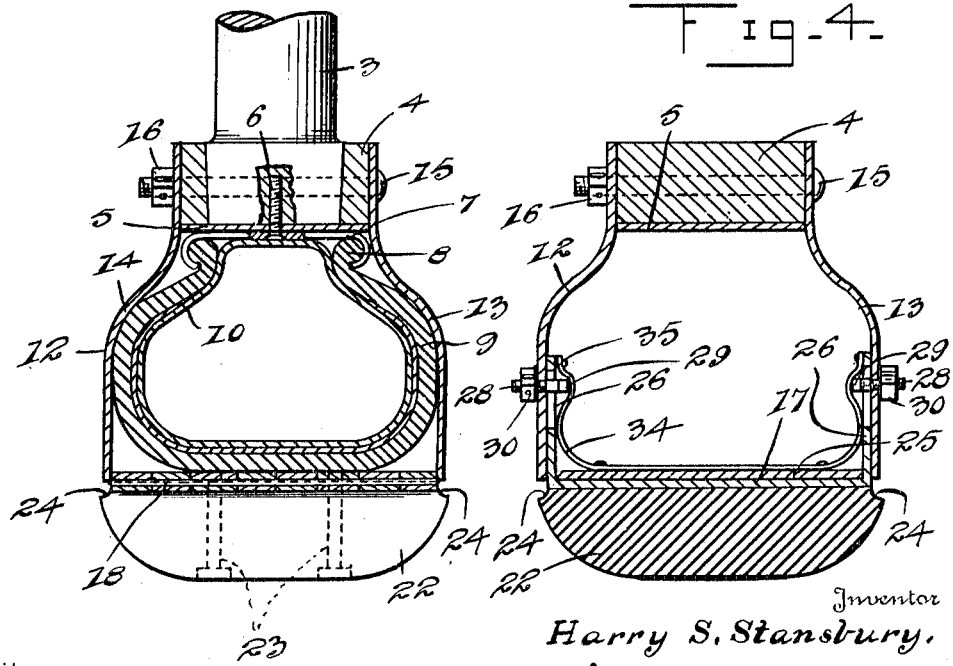

UNITED STATES PATENT OFFICE.

HARRY S. STANSBURY, OF BALTIMORE, MARYLAND, ASSIGNOR OF ONE-HALF TO JACOB M. PEARCE, OF BALTIMORE, MARYLAND.

ARMORED TIRE.

1,119,894.  Specification of Letters Patent.  Patented Dec. 8, 1914.

Application filed March 16, 1914. Serial No. 825,141.

*To all whom it may concern:*

Be it known that I, HARRY S. STANSBURY, a citizen of the United States, residing at Baltimore, in the State of Maryland, have invented certain new and useful Improvements in Armored Tires; and I do hereby declare the following to be a full, clear, and exact description of the invention, such as will enable others skilled in the art to which it appertains to make and use the same.

My invention relates to new and useful improvements in tires and more particularly to a novel form of armor whereby tires are rendered puncture proof and their efficiency and life materially increased.

An important object of my invention is to provide tire armor of the character described which will operate in connection with a solid tire which forms the tread surface and which is constructed in a number of sections that are hingedly connected with each other and mounted upon hingedly connected plates which are mounted upon the outer periphery of the pneumatic tire.

Another important object of my invention is to provide a novel form of armor casing formed in sections and arranged to slide with relation to each other so as to provide for the cushioning action of the pneumatic tire.

Another important object of my invention is to provide simple, inexpensive and effective means for materially increasing the life of the tire and which serves to prevent punctures, also in a measure to prevent skidding.

The above and additional objects are accomplished by such means as are illustrated in the accompanying drawings, described in the following specification and then more particularly pointed out as claimed.

With reference to the drawings, wherein I have illustrated the preferred embodiment of my invention as it is reduced to practice, and throughout the several views of which similar reference numerals designate corresponding parts: Figure 1 is a side elevation of a wheel having my improved armor tire thereon, Fig. 2 is a fragmentary longitudinal sectional view partly in elevation of my improved armored tire, Fig. 3 is a vertical sectional view taken on line 3—3 of Fig. 2, Fig. 4 is a vertical sectional view taken on line 4—4 of Fig. 2, Fig. 5 is a detail fragmentary perspective view showing the means for slidably connecting the armor casing sections with each other, and Fig. 6 is a fragmentary detail perspective of the hinged arcuate plates for supporting the solid tire.

Referring to the drawings by characters of reference, the numeral 1 designates as an entirety a wheel having the usual hub 2, spokes 3 and felly 4. Mounted upon the periphery of the felly 4 is a preferably metallic plate 5 having secured thereto at points suitably spaced from each other by screws or other fastening means 6, a pair of clamping members designated 7. The tire clamping members are arranged to coact with the flanged inner edges 8 of a pneumatic tire casing 9 to hold the casing 9 securely upon the felly 4 of the wheel. It has been found preferable to arrange the members 7 about ninety degrees apart so as to securely clamp the tire casing 9 upon the felly 4. An inner tube 10 of the usual construction is mounted within the casing 9 and provided with the usual valve 11 extending through the felly 4 in the usual manner toward the hub 2 of the wheel. Mounted upon the sides of the felly 4 are circumferential plates 12 and 13 which form one section of the tire armor. The plates 12 and 13 are similar as to construction and each offset intermediate their inner and outer edges as at 14 to provide a space to accommodate the tire casing 9 and tube 10. Bolts 15 are inserted through the plates 12 and 13 and felly 4 and have suitable nuts 16 turned on the unheaded terminals.

The inner edges of the plates 12 and 13 are disposed approximately flush with the inner face of the felly 4 while the outer edges of the plates extend slightly beyond the tread surface of the casing 9. Mounted upon the tread surface of the casing 9 of the pneumatic tire and arranged to slide between the plates 12 and 13 are a plurality of arcuate plates 17 that are hingedly connected at their ends with each other as at 18, provided with a plurality of fastening means receiving apertures 19 and opposed recesses 20 upon opposite sides thereof and which are for a purpose to be later more fully described. Mounted upon the outer faces of the plates 17 is a solid tire designated 21 as an entirety and which consists of a plurality of segmental tire sections each designated 22 and preferably formed of some fibrous material such as compressed paper or the like. These sections 22 are of the same length as the plates 17 are secured to the plates by means of countersunk bolts or other suitable fastening means 23. The sides of the sections 22 extend slightly beyond the sides of the plates 12 and 13 and as means for preventing the sections 22 from interfering with the sliding of the plates 17, I provide a circumferential cut out portion or recess 24 upon the inner longitudinal edges of the sections 22 as clearly shown in Fig. 3 in the drawings.

As a means for operatively connecting the plates 17 with the plates 12 and 13 I provide in connection with each plate 17 an approximately U-shaped connecting member designated 25 as entirety. The arms or side portions 26 of the U-shaped members 25 are positioned within the recesses 20 in the plates 17 in such a way that the body portions of the members 25 overlie the plates 17. The fitting of the arms 26 with the recesses 20 prevents accidental derangement of the members 25. The body portions of the members 25 are provided with apertures 27 through which the fastening means for securing the tire sections 22 may be inserted, to secure the members 25 to the plates 17.

Inserted through the plates 12 and 13 are a plurality of T-bolts 28, the heads 29 of which being approximately rectangular and disposed within the space comprehended between the plates 12 and 13. The threaded portions of the bolts extend through the plates 12 and 13 and have nuts 30 turned thereon. Formed in the side arms 26 of the members 25 are longitudinal slots 31 that are provided at their outer ends with rounded portions 32. The T-bolts 28 are arranged to slide within the slots 31 and hold the plates 17 in the proper relation to the side plates 12 and 13. In positioning the bolts 28 with relation to the slots 31 the heads 29 of the bolts are disposed in an approximately vertical position as shown in Fig. 5 and thus inserted through the slots 31. In this connection it will be noted that the T-bolts 28 are provided with squared portions 33 that are formed adjacent the points of the formation of the heads 29 with the shanks of the bolts. The shank portions of the bolts are positioned within the rounded portions 32 and turned until the angular sides of the squared portions 33 are in the position to slide within the slots 31. It will thus be seen that the heads 29 may be positioned transversely with relation to the slots 31. It will thus been seen that the bolts 28 are slidably positioned within the slots 31 in such a way that they are prevented turning and the plates 17 are securely and properly held in the desired relation to the side plates 12 and 13.

As a means for preventing the heads of the bolts 28 and 23 from injuring the tire casing 9, I provide a plurality of flexible preferably leather strips 34 that are secured at their ends by suitable means 35 to the ends of the arms 26 of the members 25 and if desired intermediate their ends to the inner faces of the members 25. The strips 34 cover the exposed portions of the fastening means and thus protect the tire casing 9.

It will be readily seen with reference to the foregoing description and accompanying drawings that I have provided simple and inexpensive armor tire which will positively prevent punctures and materially increase the efficiency and life of the tire. It will also be noted that the device may be readily assembled and disassembled for the purpose of renewing parts which may have become broken or deranged. The plates 17 in being arranged to slide relatively to the plates 12 and 13 provides the desired resiliency.

In practice, I have found that the form of my invention, illustrated in the drawings and referred to in the above description, as the preferred embodiment, is the most efficient and practical; yet realizing that the conditions concurrent with the adoption of my device will necessarily vary, I desire to emphasize the fact that various minor changes in details of construction, proportion and arrangement of parts may be resorted to, when required, without sacrificing any of the advantages of my invention, as set forth.

What is claimed is:—

1. An armor tire comprising a felly, a tire mounted upon said felly, circumferential side plates secured upon the sides of the felly and extending outwardly therefrom, said plates being offset intermediate their ends to provide an enlarged space between the outer edges to accommodate said tire, a flexible element surrounding said tire, tire sections operatively connected with the flexible element, a plurality of U-shaped members secured intermediate their ends upon the inner face of said flexible element and provided with longitudinal slots in their side arm portions and bolts secured to said side plates and slidably within the slots in said U-shaped members.

2. The combination with a wheel, felly and tire of circumferential plates secured upon the sides of said felly extending outwardly therefrom and housing said tire, a plurality of arcuate plates hingedly connected with each other surrounding said tire and slidably mounted between said first named plates, a plurality of U-shaped members secured intermediate their ends to said arcuate plates and having their arms extending inwardly and in slidable engagement with the inner faces of said first named plates, said U-shaped members having their arm portions provided with longitudinal slots, bolts secured to said first named plates and slidable in said slots and means to prevent the inner exposed ends of said bolts from injuring the tire.

In testimony whereof I affix my signature in presence of two witnesses.

HARRY S. STANSBURY.

Witnesses:
WM. D. POULTNEY,
R. MARCUS DENISON.

Copies of this patent may be obtained for five cents each, by addressing the "Commissioner of Patents, Washington, D. C."